United States Patent
Saez Cerda

(10) Patent No.: US 11,533,517 B1
(45) Date of Patent: *Dec. 20, 2022

(54) PARSING AND PROCESSING RECONSTRUCTION OF MULTIANGLE VIDEOS

(71) Applicant: Francisco Matías Saez Cerda, Vitacura (CL)

(72) Inventor: Francisco Matías Saez Cerda, Vitacura (CL)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,483

(22) Filed: Apr. 22, 2022

Related U.S. Application Data

(63) Continuation of application No. 17/344,665, filed on Jun. 10, 2021, now Pat. No. 11,368,726.

(60) Provisional application No. 63/037,956, filed on Jun. 11, 2020.

(51) Int. Cl.

| | |
|---|---|
| *G06F 15/16* | (2006.01) |
| *H04N 21/2187* | (2011.01) |
| *H04N 21/2743* | (2011.01) |
| *H04N 21/43* | (2011.01) |
| *H04N 21/845* | (2011.01) |
| *H04N 21/218* | (2011.01) |

(52) U.S. Cl.
CPC ... *H04N 21/2187* (2013.01); *H04N 21/21805* (2013.01); *H04N 21/2743* (2013.01); *H04N 21/4307* (2013.01); *H04N 21/8456* (2013.01)

(58) Field of Classification Search
CPC .............................. H04L 12/09; H04L 63/09
See application file for complete search history.

(56) References Cited

U.S. PATENT DOCUMENTS

| | | | |
|---|---|---|---|
| 8,051,453 B2* | 11/2011 | Arseneau | H04N 21/8173 725/94 |
| 2011/0271213 A1* | 11/2011 | Newman | H04L 12/1822 715/758 |
| 2012/0140048 A1* | 6/2012 | Levine | H04N 21/21805 348/51 |
| 2019/0208287 A1* | 7/2019 | Newell | H04N 21/4223 |
| 2019/0215544 A1* | 7/2019 | Hemmati | H04M 1/0264 |
| 2019/0306408 A1* | 10/2019 | Hofer | H04N 7/181 |
| 2020/0169793 A1* | 5/2020 | Akerfeldt | H04N 21/2187 |

\* cited by examiner

*Primary Examiner* — Quang N Nguyen
(74) *Attorney, Agent, or Firm* — Plager Schack LLP; Mark H. Plager; Alexis J. Saenz

(57) ABSTRACT

A system and method reconstruct multiple videos from multiple perspectives of an event into a continuous stream of the event viewable from different angles. The perspective sources may be received from different computing devices controlled by different parties. The source streams may be parsed for metadata and content perspective. The system may analyze different sources for an angle and rank the source streams based on quality and/or other metadata factors. The highest ranking source streams for a timestamp may be combined to generate a final streaming output of the event which can be displayed from different angles. Some embodiments may display the event in a continuous three-dimensional output based on the different angles of the source streams.

18 Claims, 4 Drawing Sheets

PARSING AND PROCESSING RECONSTRUCTION OF MULTIANGLE VIDEOS

CROSS REFERENCE TO RELATED APPLICATIONS

This application claims benefit under 35 U.S.C. § 119(e) of U.S. application Ser. No. 17/344,665, filed Jun. 10, 2021, which claimed priority to U.S. Provisional Application having Ser. No. 63/037,956 filed Jun. 11, 2020, which are hereby incorporated by reference in its entirety.

BACKGROUND

The embodiments herein relate generally to media processing systems, and more particularly, to parsing and processing reconstruction of multi-angle videos.

Currently, viewers of a recorded event may see individually recorded streams when posted by another person attending the event. For example, apps today may gather videos from different angles and specific points in time of a live show. However, the different videos are unsynchronized and there is no way to follow the show with any appearance of realism. The view of the event can be stagnant and dependent on the single stream a user access. This denies the viewer of the realistic experience of attending the event.

As can be seen, there is a need to improve on the end viewing experience of streamed events.

SUMMARY

In one aspect, a computer program product is disclosed for reconstruction of multi-angle videos. The computer program product comprises a non-transitory computer readable storage medium having computer readable program code embodied therewith. The computer readable program code is configured to, when executed by a computer processing unit: receive a plurality of audio/video digital streams of an event recorded by multiple computing devices, wherein the plurality of audio/video digital streams are recorded from different perspectives and two or more of the multiple computing devices are under a control of different parties present at the event; parse the respective received audio/video digital streams for metadata and a content perspective of the event; merge parsed portions of the respective received audio/video digital streams into a continuous audio/video feed of the event, viewable from a user interface; and display, through the user interface, the continuous audio/video feed of the event from multiple perspectives.

In another aspect, a method of generating a reconstruction of multi-angle videos comprises: receiving a plurality of audio/video digital streams of an event recorded by multiple computing devices, wherein the plurality of audio/video digital streams are recorded from different perspectives and two or more of the multiple computing devices are under a control of different parties present at the event; parsing the respective received audio/video digital streams for metadata and a content perspective of the event; merging parsed portions of the respective received audio/video digital streams into a continuous audio/video feed of the event, viewable from a user interface; and displaying, through the user interface, the continuous audio/video feed of the event from multiple perspectives.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology reconstruct multiple videos from multiple perspectives of an event into a continuous stream of the event viewable from different angles. An "event" as used herein may refer to a live performance or activity at which multiple people are watching in person. The perspective sources may be received from different computing devices controlled by different parties. The source streams may be parsed for metadata and content perspective. The system may analyze different sources for an angle and rank the source streams based on quality and/or other metadata factors. The highest ranking source streams for a timestamp may be combined to generate a final streaming output of the event which can be displayed from different angles. Some embodiments may display the event in a continuous three-dimensional output based on the different angles of the source streams.

Figure 1:
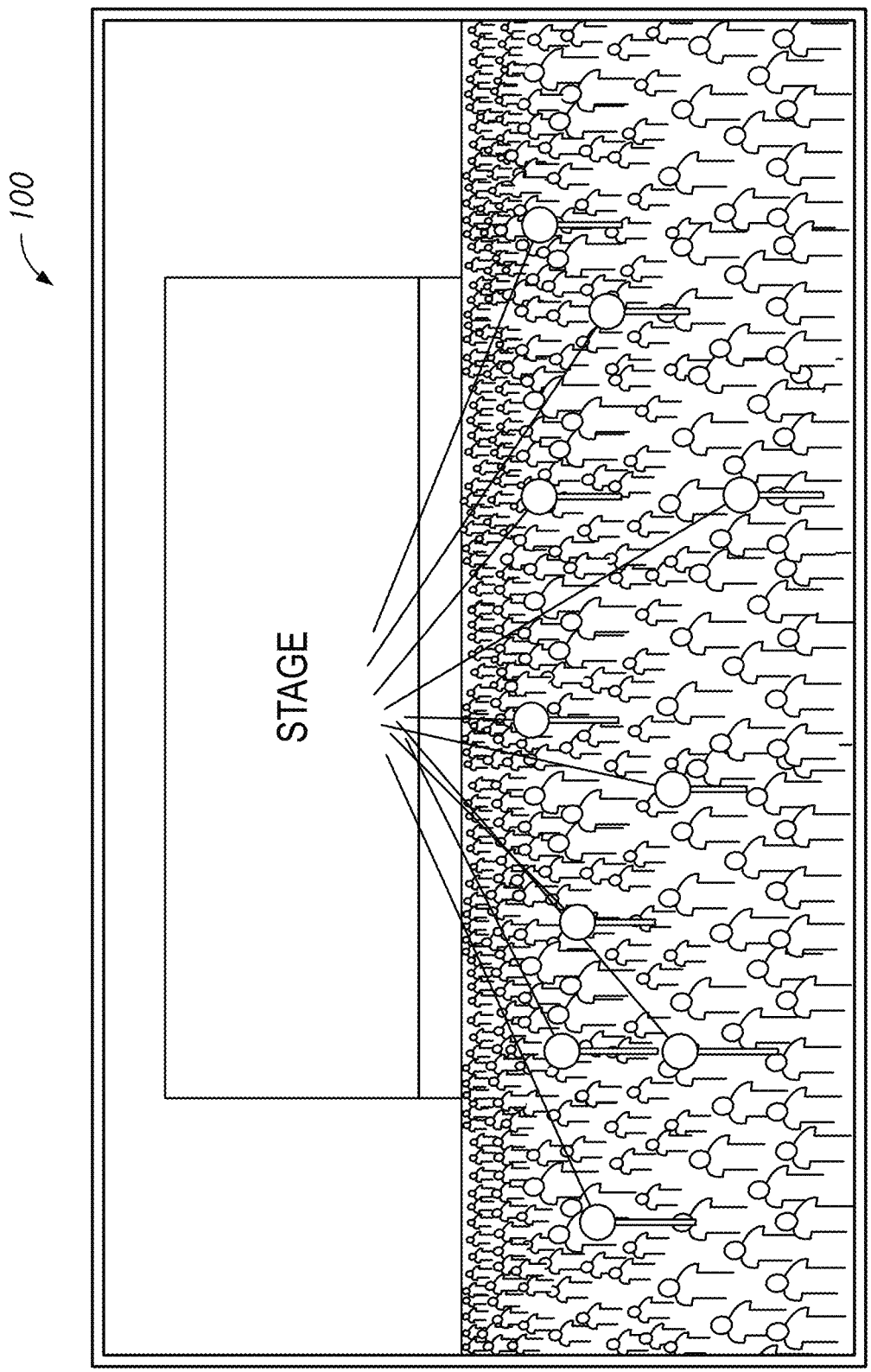
FIG. 1 is a diagrammatic view of an event being recorded by multiple parties from multiple perspectives according to an embodiment of the subject technology.

Referring now to FIG. 1, a live event 100 is shown with multiple parties recording the live event from multiple perspective vantage points at different angles to the performance (or stage). The different parties may each have a mobile computing device configured to record a digital stream of the event. The computing devices may be of different types (for example, smart phones, smart wearable device (glasses, jewelry, etc.), tablets, etc.). In one aspect, the subject technology receives the recorded digital streams as the event is occurring and rebroadcasts a conglomeration of the different audio/video sources into a stitched stream of the event using in some embodiments, the best quality feeds. In some embodiments, the rebroadcasted stream may be presented as different two dimensional perspectives that an end user may jump between by selection of different feed choices through an application programming interface (API) programmed into their computing device. In an exemplary embodiment, the conglomeration of stream sources that are chosen by the system for the final output may be displayed as a three-dimensional panoramic view of the event shown in a continuous feed of the performance. The end viewer may rotate the view of the event along different perspectives (for example, by panning the view up to 360 degrees around the stage if perspectives behind the stage are available) while the performance appears to be unbroken while rotating the view. The rebroadcasted replication of the event may be live (with a slight time delay) or reconstructed for later viewing after the event.

Figure 2:
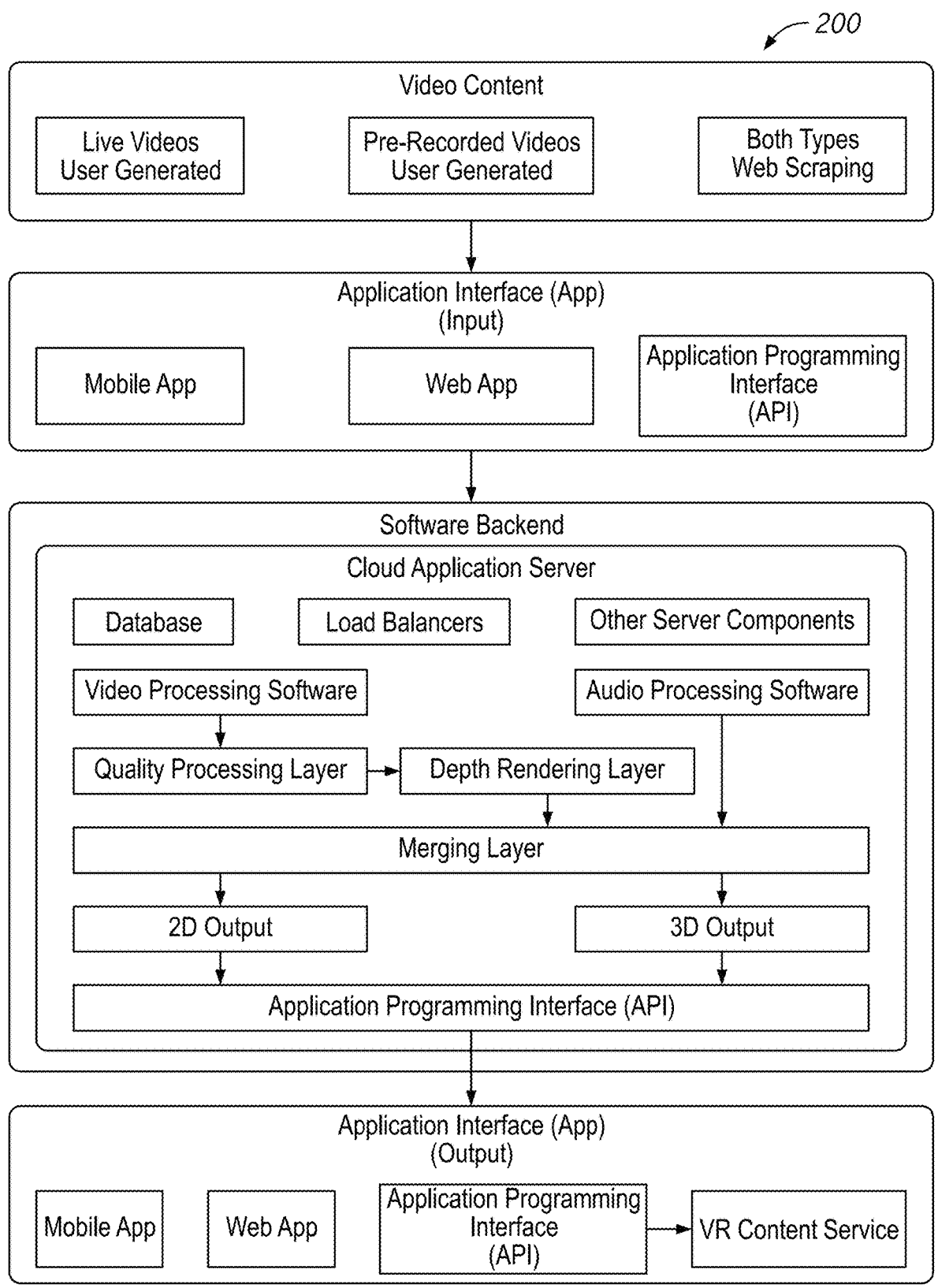
FIG. 2 is a block diagram of a system for parsing and processing reconstruction of multi-angle videos according to an embodiment of the subject technology.

FIG. 2 shows a system 200 for parsing and processing reconstruction of multi-angle videos according to an exemplary embodiment. The system 200 may include electronic data files of video content for an event. The video content may comprise user generated live videos (for example, recorded and transmitted while an event is occurring) and pre-recorded videos (for example, recorded and transmitted after the event has concluded). Some embodiments include software for scraping video content from the Internet. The system 200 may include a software app for coordinating receipt of video content and assembly of different video sources into the output stream. The app may include a mobile app version and a web-based app version. Users may generally interface with either version of the app through the API. For example, a user may open the app and while the app is open, may record video. Assuming other users of the software app are present at the same event, their respective recordings may be transmitted to a host server (represented by the box labeled "Software Backend").

The backend of the system may in some embodiments include a cloud-based server system. The components in the system may include module which may be software and/or hardware configured to provide a service for the processing and reconstruction of audio/video data into the final output. For example, the system may include a video processing module and an audio processing module. A merging module may receive data processed from the video processing and audio processing elements and may selectively combine elements from each to produce an output reconstructed digital stream of the event. Embodiments may include either two dimensional or three-dimensional displays of the event which may be seen through the API.

The app may also be configured to display the reconstructed view of the event. Users may see the reconstructed output of the event whether they are present at the event or remote. In some embodiments, the reconstructed stream of the event may be configured for use in virtual reality (VR) environments. As will be appreciated, the three-dimensional display allows a VR user to engage with the event and move around as though the user were attending the event in person.

Figure 3:
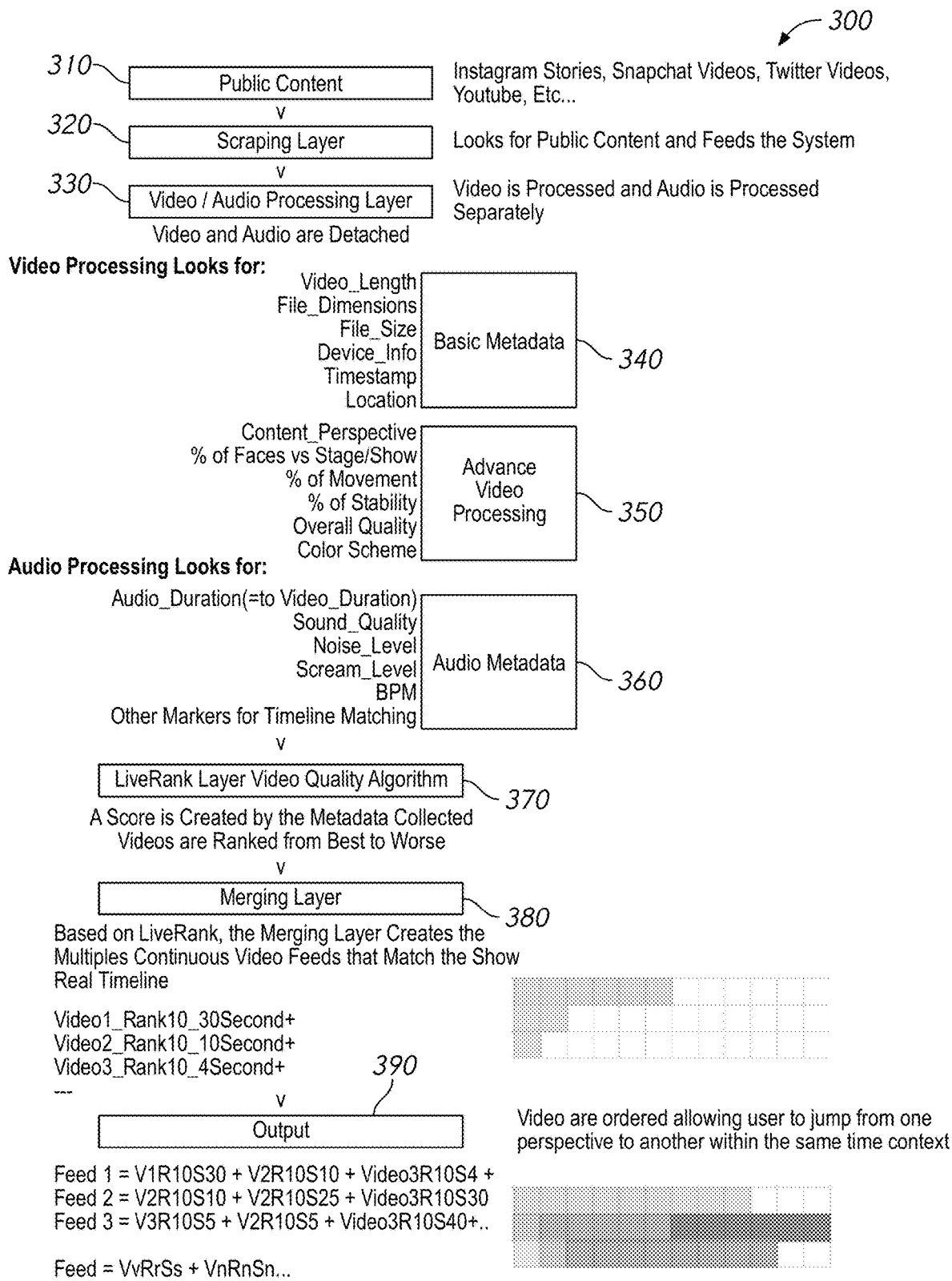
FIG. 3 is a flowchart of a process for parsing and processing reconstruction of multi-angle videos from multiple computing device sources according to an embodiment of the subject technology.

Referring now to FIG. 3, a method 300 of generating a reconstruction of multi-angle videos into a displayed broadcast of an event is shown according to an exemplary embodiment. Unless noted otherwise, a computer processor (s) in a host server or a computing device running a software embodiment may perform the steps in the method described. In the method 300, public content (for example, recorded video of an event) is available 310. "Content" as used herein generally refers to audio/video files of an event or performance. The content may be available directly from a device or may be accessed from online databases including social media accounts. A scraping layer may scrape 320 online sources for recordings of a subject event. The captured recordings may be fed into the system for processing. An audio/video processing module may process 330 the recorded streams. In some embodiments, audio files may be detached from their video files and processed as separate files. As may be appreciated later, the best quality audio and video segments of recording may be taken from different sources and combined to construct the best possible reconstruction of the event.

In some embodiments, video processing may include extracting 340 metadata from the video portion of the stream file. Attributes of metadata extracted may include for example, video length, file dimensions file size, source device information, a timestamp of the recorded stream, and location of the device for the video source. Some embodiments of the video processing may include processing 350 the video for advanced features. Attributes from advanced processing may include for example, determining the event perspective associated with the recorded content, a percentage of faces compared to the stage/show, percentage of movement, amount of stability in the recorded stream, an overall quality score for the recording, and a color scheme of the recording. For the percentage of faces attribute, the system may analyze the video with machine vision techniques to know if what is shown has more of the stage and the show, or more of a face (for example, video taken in a selfie mode) or more of the backs of attendees' heads (for example, if the source's user that was recording was too short). As will be appreciated, this feature allows the system to filter which videos are more suitable rather than the ones that are not. For example, videos with less faces (face percentage) and more of the show visible may be prioritized. For the percentage of movement, the system may evaluate whether a video source's field of view moves beyond a threshold value (which may be based on distance and frequency of oscillation) and is not stable. In some embodiments, the system may determine whether the scene should be stable and prioritize the videos that are more stable, move less. This may avoid perspectives that are difficult to view (which may cause nausea in some viewers) or may appear inconsistent with adjacent perspectives. In some embodiments, the system may also determine when the surrounding environment is suitable to show "jumpy" videos (for example, when the audience members are jumping to music) depending on the analysis of all the videos. For example, a performer on stage may cue the audience to jump. The system should be able to understand that in that specific moment, a moving video was part of the context. In some embodiments, the attributes from the advance video processing may be used to determine which stream portions from a same or similar angle/perspective at a given point in time may be used for the final output.

Audio processing may include extracting 340 audio metadata from the audio portions of a file recording. Attributes extracted may include for example, audio duration, a sound quality value, a noise level present, a scream level present in the recording, a beats per minute value, and other markers for timeline matching.

In some embodiments, the method may include a ranking module which may be configured to score 370 recordings based on one or more of the attributes in the file recordings. A process may determine rankings for streams of a same or similar perspective. In some embodiments, the end user may be presented through the API, live rankings of different perspectives. The rankings may promote which perspectives may be selected by the end user when switching between views of the event.

The method may merge different segments of recordings to generate the final output rebroadcast of the event. The output may be displayed as a continuous video feed of the event matching the event as it occurs in real time from any perspective available. In some embodiments, the output of the video shown 390 at any given time may be based on the highest ranked perspective for the given time.

Figure 4:
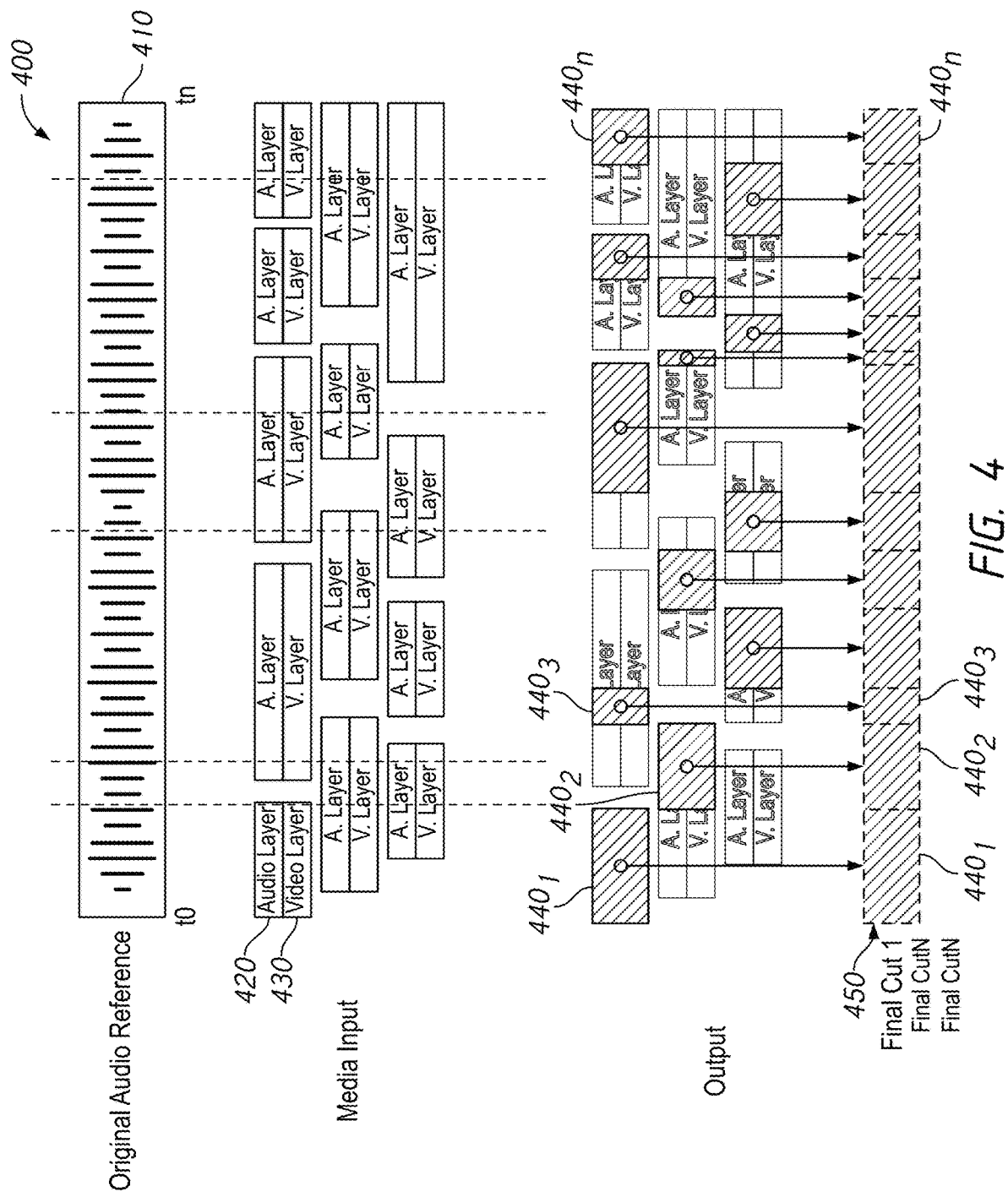
FIG. 4 is a diagrammatic view of a process stitching multiple distinct audio and video streams of an event recorded from different perspectives into a singular output according to an embodiment of the subject technology.

Referring now to FIG. 4, a diagrammatic representation 400 of stitching together different audio/video sources of the same recorded event taken from different angles of viewing is shown according to an exemplary embodiment. A reference file 410 may be used to establish a timeline in synchronization with the activity of the event. In some embodiments the file 410 may be an audio file. Media input which includes a plurality of audio files 420 and video files 430 may be provided to the system. The audio and video files 420 and 430 may be segments of audio/video files which occur at different timestamps relative to the reference file 410 timeline (from t0 to tn). As can be seen more than one audio and/or video file 420;430 may be available for a timestamp window. Exemplary embodiments may select portions of the audio files 420 and video files 430 (either based on quality, live ranking, coherence, or some other factor). The selected portions are shown in cross-hatching. Any number of portions $440_1$, $440_2$, $440_3$ to $440_n$ may be selected by the system and assembled into the final output file for display. In an exemplary embodiment, the portions $440_1$, $440_2$, $440_3$ to $440_n$ may be arranged so that one audio/video portion 440 is succeeded in content and synchronized in time with a next audio/video portion 440 so that the output file 450 appears continuous and seamless with the activity in the event; for example, so that there do not exist gaps in the displayed appearance of the event.

The computing devices/servers disclosed above may be described in the general context of computer system executable instructions, such as program modules, being executed by a computer system (described for example, below). The computing functions may be practiced in distributed cloud computing environments where tasks are performed by remote processing devices that are linked through a communications network. In a distributed cloud computing environment, program modules may be located in both local and remote computer system storage media including memory storage devices.

A computing device as described herein may typically include a variety of computer system readable media. Such media could be chosen from any available media that is accessible by the computer device/server, including non-transitory, volatile and non-volatile media, removable and non-removable media. The system memory could include one or more computer system readable media in the form of volatile memory, such as a random-access memory (RAM) and/or a cache memory. The system memory may include at least one program product having a set of program modules that are configured to carry out the functions of embodiments of the subject technology. The program product/utility may be stored in the system memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the invention as described above. For example, the program modules may carry out the steps for receiving audio/video streams from different source devices, extracting the streams for metadata and attributes, ranking streams or stream portions, determining what parts of which streams should be used to assemble the rebroadcast version of the event, and displaying the rebroadcast stream of the event through the end user device API.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed technology may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for reconstruction of multi-angle videos, the computer program product comprising a non-transitory computer readable storage medium having computer readable program code embodied thereon, the computer readable program code being configured to, when executed by a computer processing unit:

receive a plurality of audio/video digital streams of an event recorded by multiple computing devices, wherein the plurality of audio/videos digital streams are recorded from different perspectives and two or more of the multiple computing devices are under a control of different parties present at the event;

parse the respective received audio/video digital streams for metadata and a content perspective of the event;

merge the parsed portions of the respective received audio/video digital streams into a continuous audio/video feed of the event, viewable from a user interface; and display, through the user interface, the continuous audio/video teed of the event from multiple perspectives;

wherein the computer readable program code is further configured to: determine whether one of the audio/video digital streams has a field of view that moves beyond a threshold value, and determine whether the one of the audio/video digital streams is used in the continuous audio/video feed of the event based on the determination of whether the field of view moves beyond the threshold value.

2. The computer program product of claim 1, wherein the display of the event through the user interface is presented in a continuous three-dimensional perspective.

3. The computer program product of claim 1, wherein the computer readable program code is further configured to:
generate a user selectable perspective of the event;
receive a user selection of a perspective; and
display the event from the perspective associated with the received user selection.

4. The computer program product of claim 3, wherein the computer readable program code is further configured to switch display of the event between different perspectives associated with different received user selections.

5. The computer program product of claim 1, wherein the display of the event through the user interface is presented in a panoramic output.

6. The computer program product of claim 1, wherein the computer readable program code is further configured to rebroadcast the display of the continuous audio/video feed of the event from multiple perspectives, live during an occurrence of the event.

7. The computer program product of claim 1, wherein the computer readable program code is further configured to display the continuous audio/video feed of the event from multiple perspectives in a viewer immersive virtual reality setting, wherein the viewer is able to move within the event within the virtual reality setting.

8. The computer program product of claim 1, wherein:
the metadata includes timestamps associated with recorded content of the event, and
the merged parsed portions of the respective received audio/video digital streams are merged based on a continuous timeline of respective timestamps.

9. The computer program product of claim 1, wherein the computer readable program code is further configured to:
display the event through the user interface in selectable two-dimensional perspectives; and
jump between different two-dimensional perspectives in response to a user selection of perspectives.

10. A method of generating a reconstruction of multi-angle videos, comprising:
receiving a plurality of audio/video digital streams of an event recorded by multiple computing devices, wherein the plurality of audio/videos digital streams are recorded from different perspectives and two or more of the multiple computing devices are under a control of different parties present at the event;
parsing the respective received audio/video digital streams for metadata and a content perspective of the event;
merging the parsed portions of the respective received audio/video digital streams into a continuous audio/video feed of the event, viewable from a user interface; and
displaying, through the user interface, the continuous audio/video feed of the event from multiple perspectives;
wherein the method further comprising: determining whether one of the audio/video digital streams has a field of view that moves beyond a threshold value, and determining whether the one of the audio/video digital streams is used in the continuous audio/video feed of the event based on the determination of whether the field of view moves beyond the threshold value.

11. The method of claim 10, wherein the display of the event through the user interface is presented in a continuous three-dimensional perspective.

12. The method of claim 10, further comprising:
generating a user selectable perspective of the event;
receiving a user selection of a perspective; and
displaying the event from the perspective associated with the received user selection.

13. The method of claim 12, further comprising switching display of the event between different perspectives associated with different received user selections.

14. The method of claim 10, wherein the display of the event through the user interface is presented in a panoramic output.

15. The method of claim 14, further comprising rebroadcasting the display of the continuous audio/video feed of the event from multiple perspectives, live during an occurrence of the event.

16. The method of claim 14, further comprising displaying the continuous audio/video feed of the event from multiple perspectives in a viewer immersive virtual reality setting, wherein the viewer is able to move within the event within the virtual reality setting.

17. The method of claim 10, wherein:
the metadata includes timestamps associated with recorded content of the event, and
the merged parsed portions of the respective received audio/video digital streams are merged based on a continuous timeline of respective timestamps.

18. The method of claim 10, further comprising:
displaying the event through the user interface in selectable two-dimensional perspectives; and
jumping between different two-dimensional perspectives in response to a user selection of perspectives.

* * * * *